(12) United States Patent
Tan et al.

(10) Patent No.: US 8,697,270 B2
(45) Date of Patent: Apr. 15, 2014

(54) ENERGY STORAGE DEVICE

(75) Inventors: Jing Tan, Guangdong (CN); Weixin Zheng, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 181 days.

(21) Appl. No.: 13/215,771

(22) Filed: Aug. 23, 2011

(65) Prior Publication Data
US 2012/0052358 A1    Mar. 1, 2012

(30) Foreign Application Priority Data

Aug. 31, 2010 (CN) .................. 2010 2 0520258 U

(51) Int. Cl.
*H01M 2/10* (2006.01)
*H01M 10/50* (2006.01)

(52) U.S. Cl.
USPC .............................. 429/99; 429/100; 429/120

(58) Field of Classification Search
None
See application file for complete search history.

(56) References Cited

U.S. PATENT DOCUMENTS

| | | | | |
|---|---|---|---|---|
| 5,212,024 A | * | 5/1993 | Klink et al. | 429/72 |
| 5,585,204 A | * | 12/1996 | Oshida et al. | 429/62 |
| 2007/0031728 A1 | * | 2/2007 | Lee et al. | 429/120 |

* cited by examiner

*Primary Examiner* — Yoshitoshi Takeuchi
(74) *Attorney, Agent, or Firm* — Finnegan, Henderson, Farabow, Garrett & Dunner LLP

(57) ABSTRACT

An energy storage device includes a housing, a plurality of battery packs in the housing, and a first set of fluid passages disposed between battery packs, the battery packs being thermally insulated from fluid in the fluid passages.

13 Claims, 4 Drawing Sheets

ENERGY STORAGE DEVICE

CROSS-REFERENCE TO RELATED APPLICATION

The present application claims priority to Chinese Patent Application No. 201020520258.1, titled Energy Storage Battery Module, filed with the State Intellectual Property Office of the People's Republic of China (SIPO) on Aug. 31, 2010, the entire content of which is hereby incorporated by reference.

TECHNICAL FIELD

The present disclosure relates to the field of energy storage, and more particularly to an energy storage device.

BACKGROUND

In recent years, energy storage power stations are widely used for overcoming frequently occurred power interruptions, blackouts, or other emergencies, as well as for overcoming the shortages of wind power or solar power, such as environmental and seasonal influence, climatic confinement, and randomization of power generation.

Normally, an energy storage power station includes a plurality of energy storage battery modules. Working efficiencies of the energy storage battery modules have great impact to the performance of the energy storage power station. To achieve maximum efficiency, the batteries need to work at an appropriate temperature; otherwise, the battery may explode at an over-high temperature. The efficiency of the energy storage battery module depends on the efficiency of the worst single battery included therein. To achieve high efficiency of the battery module, the single cells need to have consistent energy storage as well as consistent temperature. However, there is a problem to control the temperature of the energy storage batteries.

At present, in the energy storage power stations, the energy storage battery modules are often placed in an air-conditioned space; and the energy storage battery module is formed by a plurality of energy storage batteries connected in series and/or parallel, which has a disadvantage of uneven internal temperature distribution.

SUMMARY

The present disclosure is directed to solve at least one of the problems existing in the prior art. Therefore, an energy storage device may be needed, which may have consistently distributed internal temperature field with enhanced heat exchanging efficiency.

According to an aspect of the present disclosure, an energy storage device may be provided, which may comprise: a housing; a plurality of battery packs accommodated in the housing, which are separated from each other in a first direction, forming a first fluid passage in a second direction for any two neighboring battery packs, and with surfaces of the two neighboring battery packs forming at least a portion of the first fluid passage being thermally insulated from fluid entering into or leaving from the first fluid passage. Each first fluid passage has a first inlet and a first outlet, and for any two neighboring first fluid passages, one of the first inlets is closed, and the first outlet where the first inlet is open is closed, and the fluid entering into the first fluid passage via the opened first inlet flows through the battery pack between the two neighboring first fluid passages and leaves from the opened first outlet.

According to an embodiment of the present disclosure, the first and second fluid passages may effectively enhance the heat exchange inside the energy storage device. In addition, each cell has a balanced heat exchanging efficiency. Further, the internal temperature field inside the energy storage device is distributed consistently so that the entire efficiency thereof is improved accordingly. Still further, the energy storage device has a compacted volume with increased cells per unit volume.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
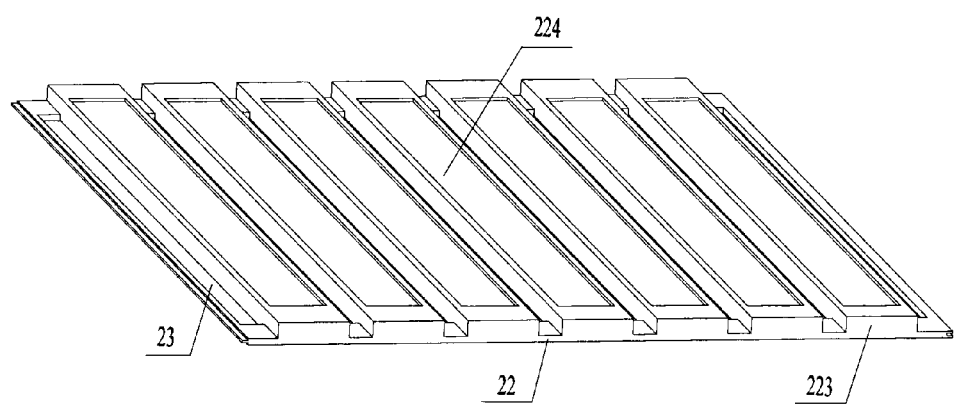
FIG. 1 is a perspective view of an upper heat insulating plate in an energy storage device according to an embodiment of the present disclosure.

Reference will be made in detail to embodiments of the present disclosure. The embodiments described herein are explanatory, illustrative, and used to generally understand the present disclosure. The embodiments shall not be construed to limit the present disclosure. The same or similar elements and the elements having same or similar functions are denoted by like reference numerals throughout the descriptions.

The inventors of the present disclosure have found, after long time research, that fluid temperature difference is large at the areas of air inlet and/or air outlet due to the heat exchange between the air and the cells in the battery pack. The heat exchange efficiency at the air inlet is high and the heat exchange efficiency at the air outlet is low, which may lead to inferior working efficiency of the whole energy storage device. In viewing thereof, the inventors have designed air passages, which are insulated from the cells inside the battery pack, to reduce, especially, the fluid temperature difference at the air inlets and the air outlets. Thus, when the air penetrates through the battery pack, the air temperature at the front part and the rear part of the battery pack are relatively uniform, so that internal temperature field of the energy storage device is uniform, which may increase the heat exchanging efficiency as well as reduce the volume needed for the cells.

Figure 3:
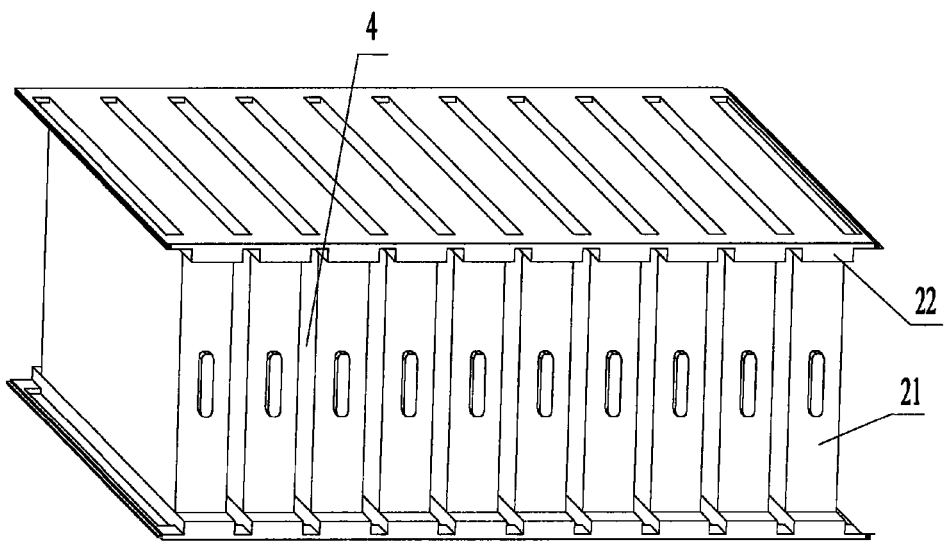
FIG. 3 is a perspective view of an energy storage device, i.e., a battery module comprising a plurality of battery packs, according to an embodiment of the present disclosure.
Figure 4:
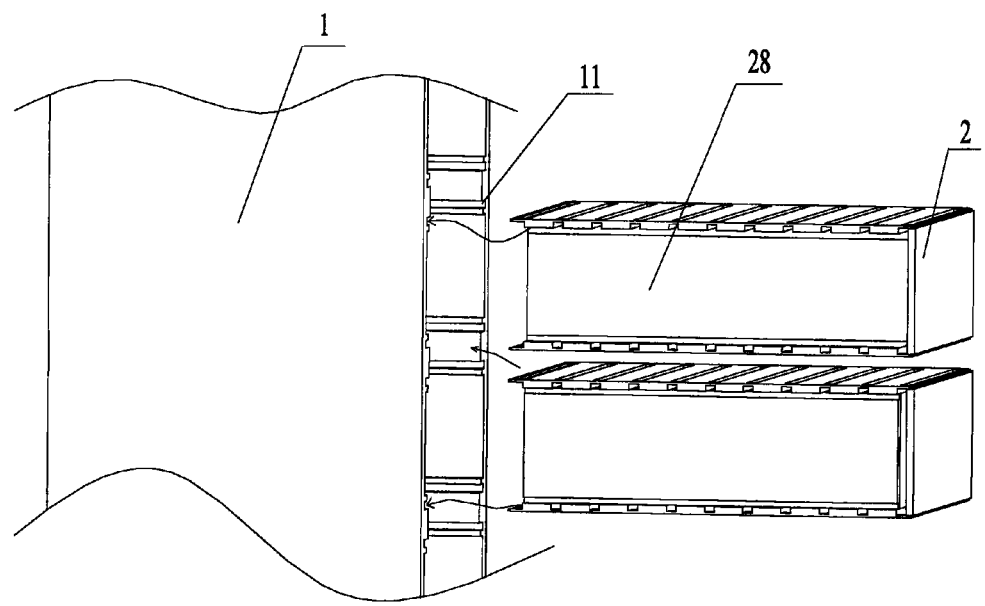
FIG. 4 is a perspective view of an energy storage device in assembling according to an embodiment of the present disclosure.

In the following, an energy storage device according to an embodiment of the present disclosure will be described in detail with reference to accompanying drawings. It should be noted that the energy storage device is implemented as a battery module for energy storage, such as a battery pack, for illustrating the gist of the present disclosure rather than limitation. FIG. 3 shows such a battery module for energy storage according to an embodiment of the present disclosure.

Figure 5:
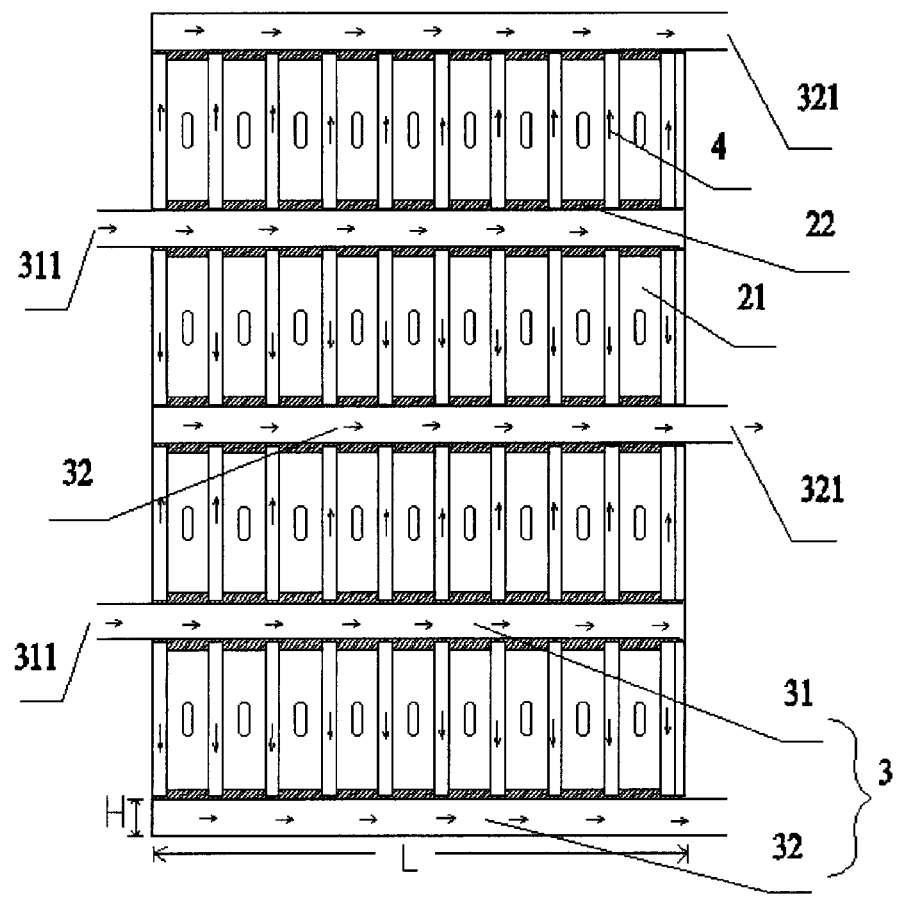
FIG. 5 is a schematic view of an energy storage device according to an embodiment of the present disclosure, in which an air flowing path is shown.

As shown in FIGS. 1-5, the battery module may include a housing 1, a plurality of battery packs 2. The battery packs 2 may be accommodated in the housing 1, which are separated from each other in a vertical direction, forming a fluid passage 3 in a horizontal direction between any two neighboring battery packs 2, with surfaces 201 of the two neighboring battery packs 2 forming at least a portion of the fluid passage 3. The batteries in the battery packs 2 may be thermally insulated from fluid in the fluid passage 3. In one embodiment, the fluid may be cooling air or liquid which is electrically insulating. As seen in FIG. 5, the battery module may include a plurality of fluid passages 3. Each fluid passage 3 may have a first inlet 311 and a first outlet 321, and for any two neighboring fluid passages 3 (e.g., fluid passages 31, 32), one of the first inlets 311 may be closed, and the first outlet 321 where the first inlet 311 is open may be closed. And the fluid entering into the fluid passage 3 via the opened first inlet 311 may flow through the battery pack 2 between the two neighboring fluid passages 3 and leave from the opened first outlet 321.

In the following, air is used as the fluid for cooling the battery pack 2. However, it should be noted that other fluid may be used instead of the air.

As shown in FIG. 3, each battery pack 2 may comprise: a pair of heat insulating plates 22 separated from each other; and a plurality of cells 21 interposed between the pair of the heat insulating plates 22, with a fluid passage 4 formed between any two neighboring cells 21 in the vertical direction. The fluid passages 4 may be in fluid communication with the fluid passages 3 formed by the pair of the heat insulating plates 22 respectively, and the detailed structure will be described in the following.

Figure 2:
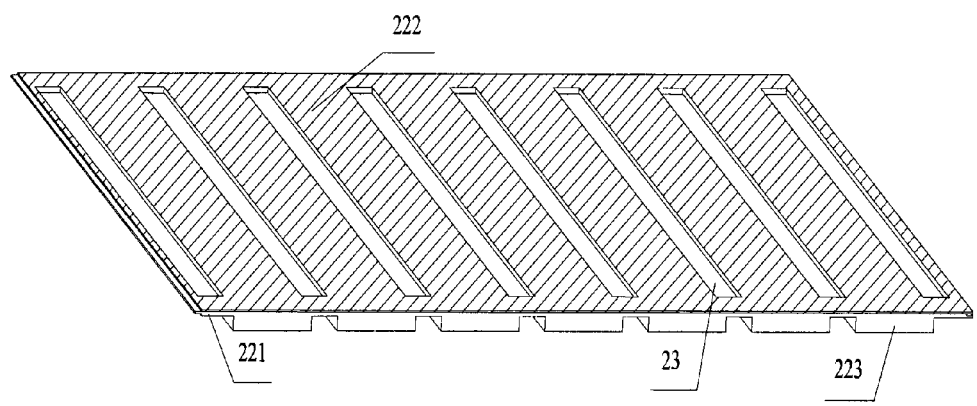
FIG. 2 is a perspective view of a lower heat insulating plate in an energy storage device according to an embodiment of the present disclosure.

As shown in FIG. 2, in one embodiment, the heat insulating plate 22 may include: a base portion 221, a plurality of projections 223 and a heat insulating layer 222. The projections 223 may be formed on the base portion 221, with each projection 223 being formed with a groove 224 to receive an end of the cell 21. This embedding structure may increase the cell stability during usage. And the projections 223 may increase the strength of the heat insulating plate 22.

In one embodiment, the heat insulating plate 22 may have an integral structure, which may be made from polyphenylene oxide (PPO), acrylonitrile-butadiene-styrene terpolymer (ABS), or other polymers.

As shown in FIG. 2, at least one via-hole 23 for the fluid flowing therethrough is formed on the base portion 221 between the two neighboring projections 223. And the heat insulating layer 222 is formed on a surface of the base portion facing toward the fluid passage 3. As explained above, the fluid passages 3 are in fluid communication with the fluid passages 4 via the via-holes 23 respectively.

In one embodiment, the base portion 221 may be made of thermally insulating material instead of the above materials. Thus, the heat exchange will not occur between the battery pack 2 and the fluid passage 3. In one embodiment, the heat insulating layer may be made from heat insulation foam, which has a low thermal conductivity, and may decrease the heat exchange between the fluid in the fluid passage 3 and the end surfaces of the cells 21, so that a uniform temperature field is obtained in the fluid passage 4.

In one embodiment, the cell 21 may have a rectangular shape, and the groove 224 is configured to receive the end of the cell 21, and both sides of the cell 21, as shown in FIGS. 1-4, in parallel to a plane formed by the vertical direction and the horizontal direction are provided with heat insulating layers 28 respectively so that heat exchange is only allowed for fluid passing through the fluid passages 4. The heat insulating layers 28 may be made from resin or rubber. The via-hole 23 is rectangular with a width in the horizontal direction equal to that of the fluid passage 4.

In one embodiment, the width of the fluid passage 4 may be about 5 to about 20 mm. And after thermal field simulation and practical usage, the inventors have found that there is optimal temperature field distribution when the fluid passage 3 may have an aspect ratio of length L to height H of about 5:1 to about 10:1 as shown in FIG. 5.

Figure 6:
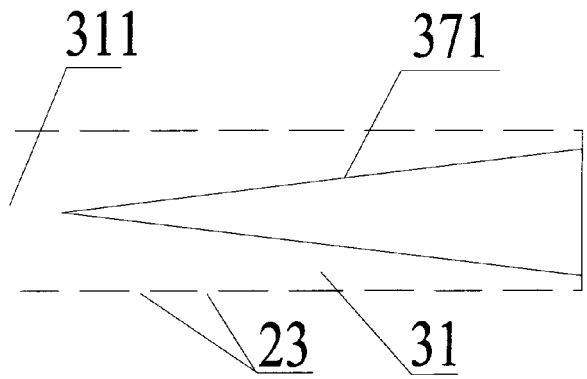
FIG. 6 is a schematic view of a first air guide in an energy storage device according to an embodiment of the present disclosure.

In one embodiment, as shown in FIG. 6, the fluid passage 3 where the first inlet 311 is open is provided with a first fluid guide 371 for smoothly distributing the fluid into the fluid passage 4. The first fluid guide 371 may have a substantially V-shape which is disposed in parallel with the horizontal direction, and the vertex of the first fluid guide 371 may be positioned facing and at the center of the first inlet 311 of the fluid passage 3 and the ends of the V-shape guide 371 are disposed at edges of the fluid passage 3 opposite to the opened first inlet 311.

In one embodiment, the fluid passage 3 where the first outlet 321 is open is provided with a second fluid guide 372 for smoothly guiding the fluid out of the fluid passage 4. The second fluid guide 372 may have a substantially V-shape which is disposed in parallel with the horizontal direction, and the vertex of the second fluid guide 372 is positioned facing and at the center of the first outlet 321 of the fluid passage 3 and the ends of the V-shape guide 372 are disposed at edges of the fluid passage 3 opposite to the opened first outlet 321.

Figure 7:
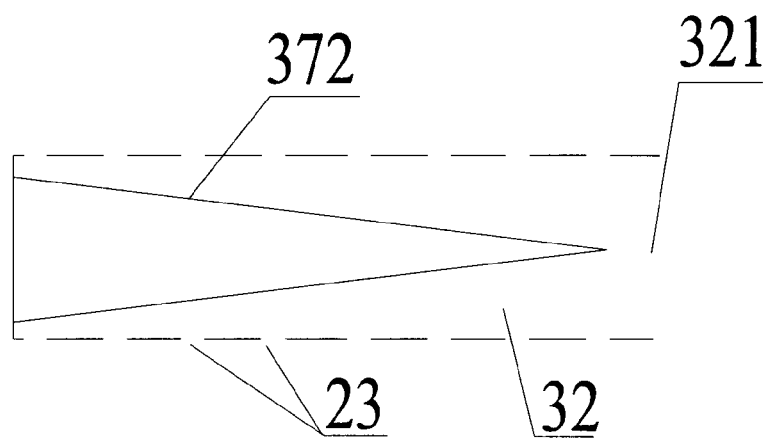
FIG. 7 is a schematic view of a second air guide in an energy storage device according to an embodiment of the present disclosure.

As shown in FIGS. 6 and 7, the fluid guides 371, 372 may increase the flow of the air, and decrease the temperature difference between the air in the inlets and the outlets, as well as enhance the uniformity of the temperature field.

In one embodiment, the housing 1 may be configured with sliding grooves 11, and the each battery pack 2 may be slidably inserted into the housing 1 via both edges of the heat insulating plates 22 which is slidable along the sliding grooves 11.

Although explanatory embodiments have been shown and described, it would be appreciated by those skilled in the art that changes, alternatives, and modifications all falling into the scope of the claims and their equivalents may be made in the embodiments without departing from spirit and principles of the present disclosure.

What is claimed is:

1. An energy storage device, comprising:
   a housing;
   a plurality of battery packs in the housing;
   a first set of fluid passages, the first set of fluid passages including:

a plurality of first fluid passages, wherein each first fluid passage has an inlet; and a plurality of second fluid passages, wherein each second fluid passage has an outlet, each second fluid passage separated from a first fluid passage by battery packs, each second fluid passage in fluid communication with each adjacent first fluid passage, the fluid that enters into the first fluid passage via the inlet flowing through the battery pack between the first and second fluid passages and leaving from the outlet of the second fluid passage, and the battery packs being thermally insulated from fluid in the first set of fluid passages, wherein each battery pack comprises:

a pair of heat insulating plates disposed at two ends of the battery pack; and a plurality of battery cells interposed between the pair of the heat insulating plates, wherein each of the heat insulating plates comprises:

a base portion made of a thermally insulating material;

a plurality of grooves each accommodating an end of one of the battery cells; and a plurality of via-holes configured to allow the fluid flowing through the via-holes on the base portion between the two neighboring grooves.

2. The energy storage device of claim 1, wherein the battery packs are separated from each other in a first direction, and the first set of fluid passages extend in a second direction, and wherein the second direction is perpendicular to the first direction.

3. The energy storage device of claim 1, further comprising:

a second set of fluid passages between the battery cells, the fluid passages of the second set being in fluid communication with adjacent fluid passages of the first set.

4. The energy storage device of claim 2, wherein each of the via-holes has a rectangular shape, and a width of a via-hole in the second direction is substantially equal to a width of a fluid passage of the second set in the second direction.

5. The energy storage device of claim 4, wherein the width of the via-hole is about 5 to about 20 mm.

6. The energy storage device of claim 1, wherein the housing includes slide grooves configured to allow the battery packs to be inserted into the housing by sliding edges of the heat insulating plates along the slide grooves.

7. The energy storage device of claim 1, wherein the battery packs include two sides covered by a heat insulating material.

8. The energy storage device of claim 1, wherein the first fluid passage of the first set is provided with a first fluid guide.

9. The energy storage device of claim 8, wherein the first fluid guide has a substantially V-shape with a vertex facing the inlet of the first fluid passage.

10. The energy storage device of claim 1, wherein the second fluid passage of the first set is provided with a second fluid guide.

11. The energy storage device of claim 10, wherein the second fluid guide has a substantially V-shape with a vertex facing the outlet of the second fluid passage.

12. The energy storage device of claim 1, wherein the inlet of the first fluid passage is positioned at an end of the first fluid passage, and the outlet of the second passage is positioned at an end of the second fluid passage that is opposite to the end of the first fluid passage that has the inlet.

13. The energy storage device of claim 1, wherein each of the fluid passages of the first set has an aspect ratio of length to height of about 5:1 to about 10:1.

* * * * *